United States Patent
Tov et al.

(10) Patent No.: US 10,129,723 B2
(45) Date of Patent: Nov. 13, 2018

(54) PROVIDING APPLICATION STORE CONTENT FROM MULTIPLE INCIDENT AREA NETWORKS

(71) Applicant: MOTOROLA SOLUTIONS, INC., Chicago, IL (US)

(72) Inventors: Jacob Shem Tov, Beit Zayit (IL); Shahar Kuchuk, Petah Tikva (IL); David Mizrachi, Tel Aviv (IL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 81 days.

(21) Appl. No.: 15/434,090

(22) Filed: Feb. 16, 2017

(65) Prior Publication Data
US 2018/0234788 A1    Aug. 16, 2018

(51) Int. Cl.
| | | |
|---|---|---|
| H04W 36/00 | (2009.01) |
| H04W 24/02 | (2009.01) |
| H04W 48/10 | (2009.01) |
| H04W 36/14 | (2009.01) |
| H04W 84/18 | (2009.01) |
| H04W 48/18 | (2009.01) |
| H04W 36/26 | (2009.01) |
| H04W 84/10 | (2009.01) |
| H04W 4/60 | (2018.01) |
| H04W 4/90 | (2018.01) |
| H04W 4/50 | (2018.01) |

(52) U.S. Cl.
CPC ............ *H04W 4/60* (2018.02); *H04W 4/50* (2018.02); *H04W 4/90* (2018.02); *H04W 24/02* (2013.01); *H04W 36/0061* (2013.01); *H04W 36/14* (2013.01); *H04W 48/10* (2013.01); *H04W 36/26* (2013.01); *H04W 48/18* (2013.01); *H04W 84/105* (2013.01); *H04W 84/18* (2013.01)

(58) Field of Classification Search
CPC ... H04W 4/60; H04W 36/0061; H04W 24/02; H04W 4/50; H04W 4/90; H04W 48/10; H04W 36/14; H04W 84/18; H04W 48/18; H04W 36/26; H04W 84/105; H04W 4/003; H04W 4/001; H04W 4/22
USPC ................ 455/404.1, 436–445; 370/331
See application file for complete search history.

(56) References Cited

U.S. PATENT DOCUMENTS

| | | | |
|---|---|---|---|
| 9,986,483 B1* | 5/2018 | Balmakhtar | H04W 36/38 |
| 2004/0010544 A1 | 1/2004 | Slater et al. | |
| 2005/0265256 A1 | 12/2005 | Delaney | |
| 2008/0194246 A1* | 8/2008 | Klein | H04W 8/082 |
| | | | 455/422.1 |

(Continued)

OTHER PUBLICATIONS

The International Search Report and the Written Opinion corresponding application serial No. PCT/US2018/016409 filed Feb 1, 2018, dated Apr. 12, 2018, all pages.

*Primary Examiner* — Michael Y Mapa

(57) ABSTRACT

A method and apparatus for coordinating applications between incident-area networks (IANs) are provided herein. During operation an application server (serving as an app store within an IAN) will monitor all IAN Apps stores that are on scene (at an incident). All app stores on scene will share information regarding the content/applications they can provide. When a connected radio requests particular content from an IAN, the application server will determine a best app store to provide the content. The connected radio will be directed to hand over to the appropriate IAN app store to retrieve the content.

15 Claims, 3 Drawing Sheets

(56) References Cited

U.S. PATENT DOCUMENTS

| | | | |
|---|---|---|---|
| 2012/0082131 A1* | 4/2012 | Agrawal | H04W 36/08 370/331 |
| 2012/0173665 A1* | 7/2012 | Oh | H04N 21/25833 709/217 |
| 2015/0058834 A1* | 2/2015 | Chan | G06F 21/572 717/169 |
| 2016/0182681 A1* | 6/2016 | Shao | H04L 67/2814 709/205 |
| 2016/0366055 A1 | 12/2016 | Leach | |
| 2017/0019482 A1* | 1/2017 | Wang | H04L 67/06 |
| 2017/0064621 A1* | 3/2017 | Garg | H04W 48/18 |
| 2018/0189177 A1* | 7/2018 | Guim Bernat | G06F 12/06 |

\* cited by examiner

US 10,129,723 B2

PROVIDING APPLICATION STORE CONTENT FROM MULTIPLE INCIDENT AREA NETWORKS

FIELD OF THE INVENTION

The present invention generally relates to incident-area networks (IANs), and more particularly to a method and apparatus for providing content to devices from multiple application stores residing within multiple IANs.

BACKGROUND OF THE INVENTION

It is important that public-safety responders have adequate communication services (e.g., telephony, push-to-talk service, data services, and the like) when responding to an incident. However, the reality of the dynamic and mobile nature of the profession is that, in many instances, incidents occur outside of the range or coverage of the established radio access networks (RANs), or alternatively, the RAN does not have the capacity to handle all services required at an incident. To facilitate communication needs of responders, incident area networks (IANs) are often deployed using mobile base stations.

IANs are self-forming, temporary network infrastructures brought to the scene of an incident to support personal and local communications among different public safety end-users. Mobile devices on scene will associate with the IAN and receive services through the IAN. The IAN will have a unique system identification (SSID) known to the communication devices on scene.

As described above, IANs are self-forming networks that revolutionize the way Homeland Security, Law Enforcement, and Emergency Responders establish field command and control by providing broadband data, video and voice communications without the need for fixed infrastructure. Public-safety personnel are be able to instantly set up mobile broadband incident area networks wherever they are required, creating a secure, mission-critical network at single and multi-agency incidents both large and small.

Part of the services provided by an IAN is making available necessary applications and data to users for download. Relevant data and applications will be stored in a central repository within the IAN. The repository is sometimes referred to as an Application Store (or an App Store). For example, an App Store within an IAN may contain content such as a map of a building where an incident is occurring. The map may be downloaded by devices associated with the IAN. Applications may also be provided by the IAN. Thus, the IAN can serve as an An app store (or app marketplace) acting as a digital distribution platform for computer software (apps) and data, often in a mobile context. Apps provide a specific set of functions.

In a large incident scene many autonomous IANs may be brought on scene. Each IAN will bring it its own Apps store. These IAN app stores may store different content, applications, and application versions. For example, a mapping application for a first IAN may comprise version 2 of the application, and the same mapping application from a second IAN may comprise an updated version 3 of the application. Similarly, the second IAN may comprise a map of a building on scene, while the first IAN may not have the map. It will very useful if there were a method and apparatus for providing content (applications and data) to devices from multiple application stores residing within multiple IANs so that any device may obtain a best version of an application and all available content residing on any app store from the multiple IANs.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Figure 1:
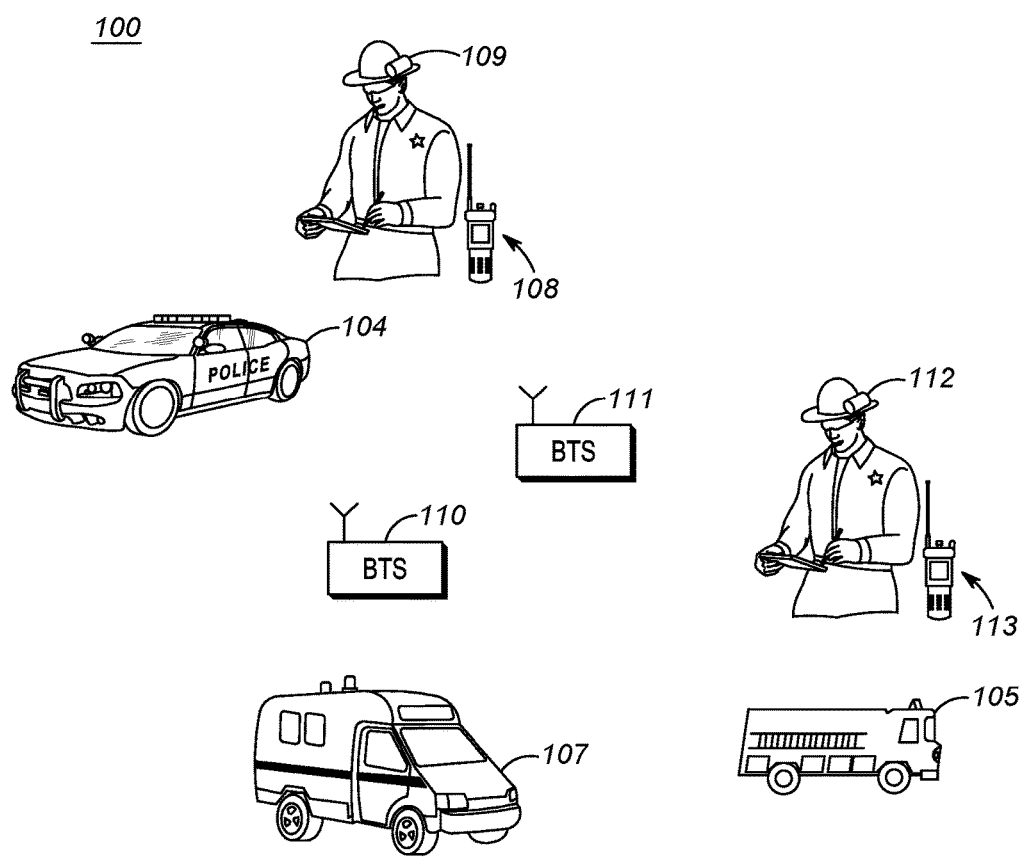
FIG. 1 is a general operating environment for the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above, mentioned need, a method and apparatus for coordinating applications between incident-area networks (IANs) are provided herein. During operation an application server (serving as an app store within an IAN) will monitor other IAN Apps stores that are on scene (at an incident). App stores on scene will share information regarding the content they can provide. When a connected radio requests particular content from an IAN, the application server will determine another app store to provide the content. The connected radio will be directed to hand over to the appropriate IAN app store to retrieve the content.

As described above, content comprises any application or data that a device may download from the app store. The determination of another (e.g., a best) app store may comprise a determination as to what app store has the latest version of a requested application. In another embodiment, the determination of another app store may comprise a determination as to what app store has the requested application (not all app stores will have every requested application). In yet another embodiment, the determination of another app store may further comprise a determination of the IAN providing a best quality of the application data (bandwidth, speed, resolution, . . . , etc.)

In another embodiment of the present invention application data (e.g., maps provided to a mapping application, weather data provided to a weather application, . . . , etc.) can be provided in different versions by differing IANs, even though the application software provided by the IANs is a same version. In this case, the best app store may be determined by the IAN providing a highest-quality data as determined by resolution, bandwidth, data version, . . . , etc.

A best app store may also be determined by choosing an app store having the most cached date. For example, application data for an incident scene may be cached from a global database and an amount of the cached data can be different between IAN's app stores. A best app store may be the app store residing in the IAN that has the most data cached.

It should be noted that IANs at a particular incident scene will be constantly changing as IANs join and leave the area. All IANs will periodically poll the incident scene to determine what IANs have joined the incident scene and receive an inventory of content provided by the IANs joining the incident scene.

If an IAN is leaving the incident scene, or being shut down, it will direct all connected radios to hand over to another IAN on scene. Radios that hand over to another IAN may have to change the version of their currently-running applications so that they may continue to function with a particular IAN. For example, when a serving IAN is leaving an incident scene (or shutting down), all remaining IANs may have a lower version of a particular application. There may no forward compatibility between various versions. For example, data provided by an IAN may not be compatible with a particular version of software being run by a radio. In this case the radios having the higher version will need to downgrade their versions prior to handing over to another IAN.

With the above in mind, IANs that are shutting down, or leaving an incident scene will determine those applications it is currently supporting with connected radios. The IAN will direct each radio to hand over to the best IAN, determined as described above.

Turning now to the drawings wherein like numerals designate like components, FIG. 1 is a block diagram showing a general operational environment, according to one embodiment of the present invention. More particularly, FIG. 1 shows a typical incident scene 100 where multiple agencies and multiple IANs are on scene. As shown in FIG. 1 a plurality of public-safety vehicles 104-105 and various personnel 109, 112 are in communication with several deployable base stations 110 and 111 (serving as base stations for an IAN). Base stations 110 and 111 may comprise one of any number of small, deployable base stations equipped to provide service to a small area such as an incident scene. Such base stations 110 and 111 include, but are not limited to a Cell on Wheels (COW), a System on Wheels (SOW), or an aerial deployment of a base station as part of an IAN.

It should be noted that although only two public-safety officers 109, 112 are shown, one of ordinary skill in the art will recognize that many more officers may be on scene. Additionally, while each public-safety officer in FIG. 1 has only one associated device 108, 113, one of ordinary skill in the art will recognize that each officer may be carrying many connected devices, such as, but not limited to tablet computers, cellular telephones, public-safety radios, . . . , etc.

A typical deployment of IANs as shown in FIG. 1 may have a first plurality of devices associated with a first IAN (served by, for example base station 110), and a second plurality of devices associated with a second IAN (served by, for example, base station 111). Each base station will provide a unique SSID and serve as an access point for their respective IAN. For example, police officer 109 may carry a public-safety radio 108 that is served by portable base station 110, while police officer 112 carries public-safety radio 113 that is served by portable base station 111. As described above, each IAN will have its own application store (not shown) where devices may obtain content. In this particular illustration the functionality of the above-described app store is placed within each base station 110 and 111, although in alternate embodiments of the present invention app stores may be placed in stand-alone servers.

As discussed above, in a large incident scene many autonomous IANs may be brought on scene. Each IAN will bring it its own app store. These app stores may store different applications and application versions. For example, a mapping application for a first IAN may comprise version 2 of the application, and the mapping application from a second IAN may comprise version 3 of the application. Similarly, the second IAN may comprise a map of a building on scene, while the first IAN may not have the map. It will very useful that there were a method that all users at the incident will be provided all available applications, and those applications with a best version.

In order to address this issue, app stores within base stations 110 and 111 will provide information to each other as to what content they currently can provide to devices. Each app store will keep an inventory of all available content on scene. When a connected radio requests particular content, the app store will determine a best app store to provide the content. The connected radio will be directed to hand over to the appropriate app store to retrieve the content. Consider FIG. 1 as an example. Assume radio 108 is connected to base station 110 containing a first app store, and that radio 113 is connected to base station 111 containing a second app store. Assume radio 108 has requested a map of a building from the first app store within base station 110. If the first app store "knows" that a higher version of the map is available from the second app store, base station 110 will direct radio 108 to hand over to base station 111 and again request the map.

Figure 2:
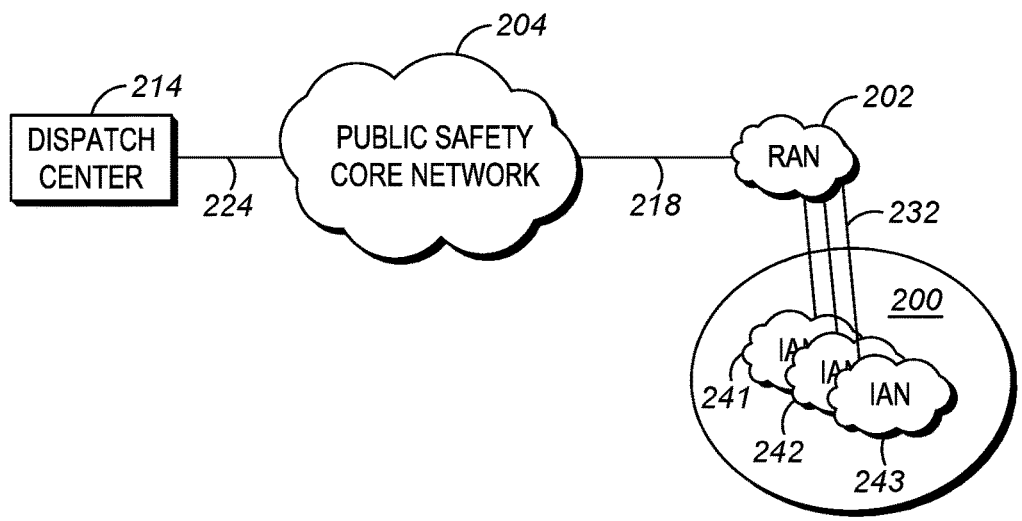
FIG. 2 depicts an example communication system having several IANs deployed at an incident scene.

FIG. 2 depicts an example communication system having several IANs 241-243 deployed at incident scene 200. Incident scene 200 preferably comprises a geographic area surrounding a particular public-safety incident (e.g., fire, crime, robbery, . . . , etc.). As shown in FIG. 2, one or more radio access networks (RANs) 202, a public-safety core network 204, dispatch center 214, and communication links 218, 224, and 232 are provided. In a preferred embodiment of the present invention, IANs 241-243 have multiple connected devices (not shown in FIG. 2), with communication links 232 (only one labeled) formed between IANs and RAN utilizing one of any number of over-the-air communication system protocols.

As discussed above, each IAN 241-243 comprises a deployable base station (not shown in FIG. 2) and all necessary network infrastructure brought to the scene of an incident to support personal and local communications among different public safety end-users. Mobile devices on scene will associate with the IAN and receive services through the IAN.

RAN 202 and IANs 241-241 includes typical elements such as base stations, base station controllers (BSCs), routers, switches, and the like, arranged, connected, and programmed to provide wireless service in a manner known to those of skill in the relevant art.

The public-safety core network 204 may include one or more packet-switched networks and/or one or more circuit-switched networks, and in general provides one or more public-safety agencies with any necessary computing and communication needs, transmitting any necessary public-safety-related data and communications.

IANs 241-243 are configured to engage in wireless communication with the RAN 202 over the air interface as is known to those in the relevant art. Moreover, one or more IANs 241-243 are further configured to engage in wired and/or wireless communication with one or more local device (not shown) via over-the-air communication links. As discussed above, each IAN 241-243 will comprise an application server, serving as an app store. It should be noted that although each IAN shown in FIG. 2 may provide services to the whole incident scene, or only a portion of the incident scene.

Finally, dispatch center 214 is part of a computer-aided-dispatch center, manned by an operator providing necessary dispatch operations. For example, dispatch center 214 typically comprises a graphical user interface that provides the dispatch operator necessary information about public-safety officers.

Figure 3:
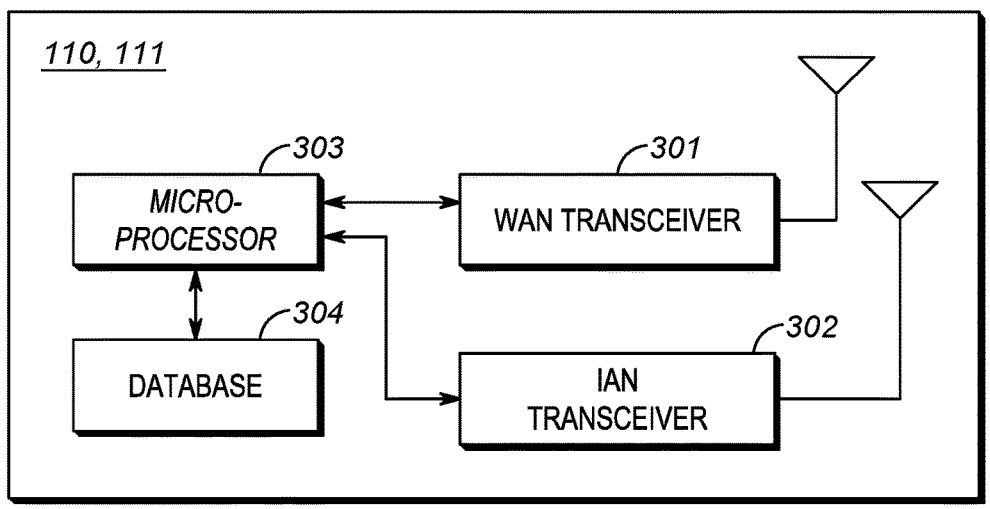
FIG. 3 is a block diagram of a base station of FIG. 1 used to provide an app store to an IAN.

FIG. 3 is a block diagram of a base station of FIG. 1 used to provide an app store to an IAN. As shown, base stations 110 and 111 may include a wide-area-network (WAN) transceiver 301 (e.g., a transceiver that utilizes a public-safety communication-system protocol), IAN transceiver 302 (e.g., a short-range transceiver), logic circuitry 303, and database 304. In other implementations, base stations 110 and 111 may include more, fewer, or different components.

WAN transceiver 301 may comprise well known long-range transceivers that utilize any number of network system protocols. (As one of ordinary skill in the art will recognize, a transceiver comprises both a transmitter and a receiver for transmitting and receiving data). For example, WAN transceiver 301 may be configured to utilize a next-generation cellular communications protocol operated by a cellular service provider, or any public-safety protocol such as an APCO 25 network or the FirstNet broadband network.

IAN transceiver 302 may be well known short-range (e.g., 30 feet of range) transceivers that utilize any number of network system protocols. For example, IAN transceiver 302 may be configured to utilize Bluetooth communication system protocol for a body-area network, or a private 802.11 network.

Database 304 comprises memory that is used to store content provided as part of an application store. For example, database 304 may store applications, maps, blueprints, and other content that may be requested for download by any connected device. As described above, database 304 will also store information regarding the content stored by other base stations on scene. So, for example, along with storing its own content, database 304 will contain a list of applications, their versions, and all other content stored in other databases on other base stations on scene.

Logic circuitry 303 comprises a digital signal processor (DSP), general purpose microprocessor, a programmable logic device, or application specific integrated circuit (ASIC) and is configured to provide application-store services to connected devices.

Logic circuitry 303 will periodically instruct IAN transceiver to poll IANs on scene to retrieve an inventory of content stored at each IAN. This inventory of content for each IAN will be stored in database 304. When IAN transceiver receives a request for content from a connected device (radio). Logic circuitry 303 will analyze database 304 to determine a best base station to provide the requested content. Logic circuitry 303 will either forward the content from database 304, or instruct the requesting device to hand over to another IAN and again request the content.

The instructions to hand over to another IAN may simply comprise a message to a connected device that a better copy of the requested content resides on a particular IAN. The user of the connected device may choose to hand over the connected device and again request the content, or alternatively, may decline to hand over and download the content from the IAN. For example, a message such as, "A better version of this software is available from FIREGROUND IAN, do you still want the requested software?". If the device answers "yes", the IAN will provide the requested content. However, if the device answers "no", then the user will need to force a handover to another IAN and again request the software.

In yet another embodiment of the present invention, if the user answers "no", then the device may automatically be handed over to the other IAN, and the software automatically be provided.

With the above in mind, FIG. 3 shows an access point 110, 111 as part of a self-forming, temporary network infrastructure brought to a public-safety incident scene to support personal and local communications among different public safety end-users. The access point comprises an IAN transceiver 302 configured to provide communication services at the public-safety incident scene, the IAN transceiver 302 also configured to message other access points at the public-safety incident scene to determine information on applications and content stored on the other access points, wherein the other access points are part of other self-forming, temporary network infrastructures brought to the public-safety incident scene to support personal and local communications among different public safety end-users, the IAN transceiver also configured to receive a request for particular content from a device associated with the first access point.

A database 304 is provided for storing the information on applications and content stored on the other access points, and logic circuitry 303 is configured to access the database to determine that a best source for the content is a second IAN, the determination based on the information stored on the database. The IAN transceiver 302 is also configured to direct the device to hand over to a second access point to retrieve the content. As discussed the first access point and the second access point have differing system identifications SSIDs and an overlapping coverage area.

Figure 4:
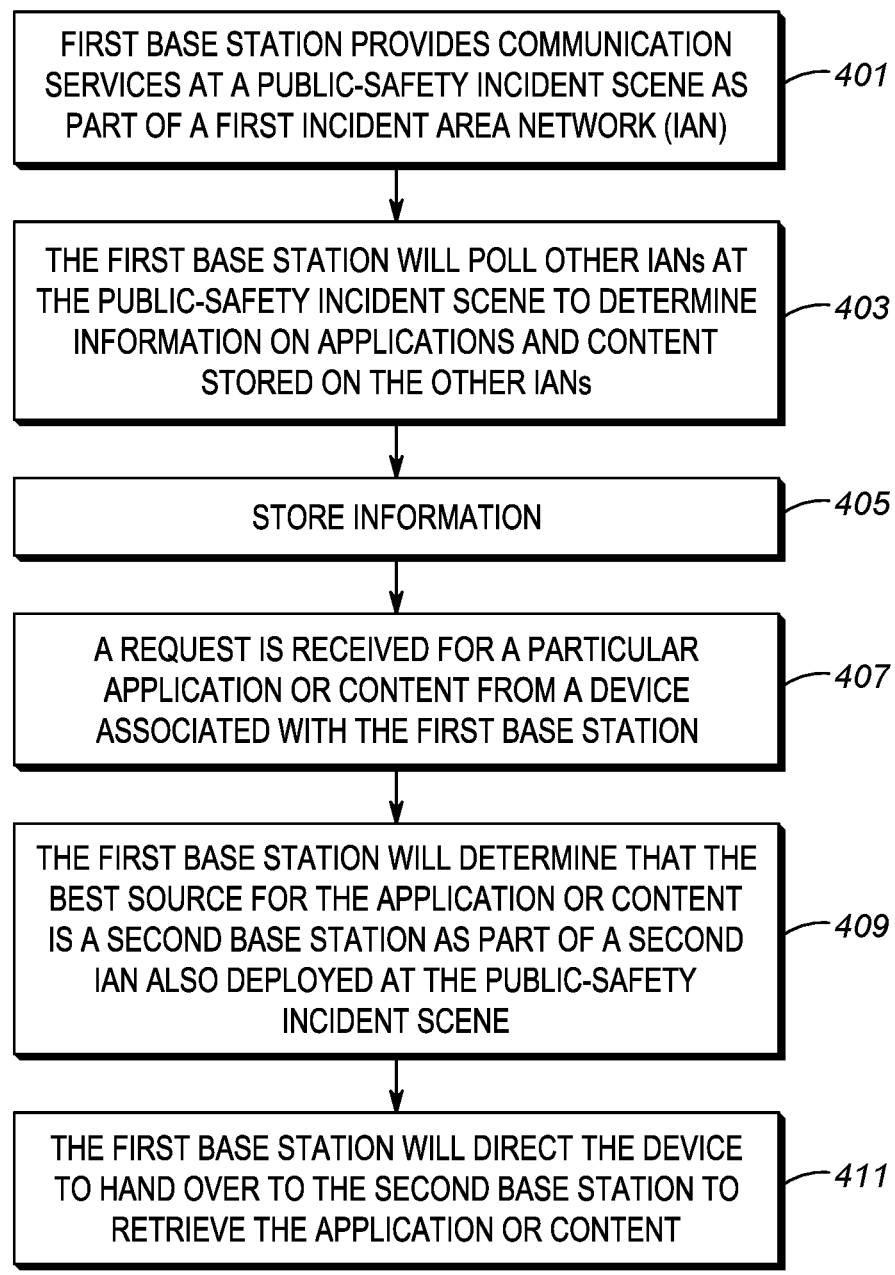
FIG. 4 is a flow chart showing operation of a base station of FIG. 1.

FIG. 4 is a flow chart showing operation of an IAN of FIG. 1. In particular, FIG. 4 shows those steps (not all necessary) for a first base station of FIG. 1 to provide content to devices. The logic flow begins at step 401 where the first base station provides communication services at a public-safety incident scene as part of a first incident area network (IAN) deployed at a public-safety incident scene. For example, base station 110 may be providing services to radio 108 such as, but not limited to data services, internet services, email services, push-to-talk radio services, . . . , etc.

During operation the first base station will poll other IANs at the public-safety incident scene to determine information on applications and content stored on the other IANs (step 403). More specifically, the base station will message other base stations from other IANs to determine what applications and content they have stored as part of their app store. This information will be stored in an internal database (step 405). For example, the internal database may comprise a SSID for a particular base station along with all applications and data (content) available in the particular base station's app store. Version information may also be stored.

At step 407 a request is received for a particular application or content from a device associated with the first base station (associated with the first IAN). At step 409 the first base station will determine that another source for the application or content is a second base station as part of a second IAN also deployed at the public-safety incident scene. The other source for the application may be a best source (e.g., a highest version) for the application. The determination of the another base station (best IAN) will be based on the stored information. Finally, at step 411 the first base station will direct the device to hand over to the second base station to retrieve the application or content. The second base station may upgrade or downgrade the application or content on the device.

As discussed, the step of directing the device to hand over to the second IAN may comprise notifying the device that a better version of the application or content resides on the second IAN. Alternatively, the step of directing the device to hand over to the second IAN may comprise the step of initiating an autonomous handover of the device to the second IAN.

As discussed above, the first IAN (and hence the first base station) and the second IAN (and hence the second base station) have differing system identifications SSIDs and overlapping coverage areas.

As discussed above, the first base station may turn off, or leave the incident scene. When this happens, the first base station will determine that it is powering down or leaving and determining all devices currently served by the first base station. Current content and applications utilized by the devices will be determined and the devices will be directed to hand over to other IANs based on the information on applications and content stored on the other IANs.

It should be noted that the base stations of FIG. 1 can be thought of as access points for their respective networks (IANs). When thought of as such, FIG. 1 shows communication services being provided by a first access 110 point deployed at a public-safety incident scene, the first access point configured to be part of a self-forming, temporary network infrastructures brought to the public-safety incident scene to support personal and local communications among different public safety end-users. The first access point 110 will poll other access points at the public-safety incident scene to determine information on applications and content stored on the other access points, wherein the other access points are also configured to be part of other self-forming, temporary network infrastructures brought to the public-safety incident scene to support personal and local communications among different public safety end-users.

The first access point 110 will receive a request for particular content from a device associated with the first access point and determine that another source for the content (e.g., a best source) may be a second access point 111 at the public-safety incident scene, the determination based on the information on the applications and the content stored on the other access points. As discussed, the first access point 110 will direct the device to hand over to the second access point 111 to retrieve the content. The first access point and the second access point have differing system identifications SSIDs and overlapping coverage areas.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for providing content to devices, the method comprising the steps of:
   providing application to the devices at a public-safety incident scene as part of a first incident area network (IAN) deployed at a public-safety incident scene;
   storing an application for transfer to devices at the public-safety incident scene;
   polling other IANs at the public-safety incident scene to determine a version of the application stored on the other IANs;
   receiving a request for the application from a device associated with the first IAN;
   determining another source for the application is a second IAN at the public-safety incident scene, the determination based on the second IAN having a higher version of the application stored on the second IAN; and
   directing the device to hand over to the second IAN to retrieve the application.

2. The method of claim 1 wherein the step of directing the device to hand over to the second IAN comprises the step of notifying the device that a better version of the application resides on the second IAN.

3. The method of claim 1 wherein the step of directing the device to hand over to the second IAN comprises the step of initiating an autonomous handover of the device to the second IAN.

4. The method of claim 1 wherein the first IAN and the second IAN have differing system identifications SSIDs and overlapping coverage areas.

5. The method of claim 1 further comprising the steps of:
   determining that the first IAN is powering down or leaving the public-safety incident scene;
   determining all devices currently served by the first IAN;
   determining current content and applications utilized by the all devices currently served by the first IAN; and
   directing the all devices to hand over to other IANs based on the information on applications and content stored on the other IANs.

6. A method comprising the steps of:
   providing communication services by a first access point deployed at a public-safety incident scene, the first access point configured to be part of a self-forming, temporary network infrastructures brought to the public-safety incident scene to support personal and local communications among different public safety end-users;
   storing an application for transfer to devices at the public-safety incident scene;
   polling by the first access point, other access points at the public-safety incident scene to determine versions of the application stored on the other access points, wherein the other access points are also configured to be part of other self-forming, temporary network infrastructures brought to the public-safety incident scene to support personal and local communications among different public safety end-users;
   receiving a request for the application from a device associated with the first access point;
   determining another source for the application is a second access point at the public-safety incident scene, the determination based on the version of the application stored on the second access point; and
   directing the device to hand over to the second access point to retrieve the application; and
   wherein the first access point and the second access point have differing system identifications and overlapping coverage areas.

7. The method of claim 6 wherein the step of directing the device to hand over to the second access point comprises the step of notifying the device that a better version of the application resides on the second access point.

8. The method of claim 6 wherein the step of directing the device to hand over to the second access point comprises the step of initiating an autonomous handover to the second access point.

9. The method of claim 6 further comprising the steps of:
   determining that the first access point is powering down or leaving the public-safety incident scene;
   determining all devices currently served by the first access point;
   determining current content and applications utilized by the all devices currently served by the first access point; and
   directing the all devices to hand over to other access points based on the information on applications and content stored on the other access points.

10. A first access point as part of a self-forming, temporary network infrastructure brought to a public-safety incident scene to support personal and local communications among different public safety end-users, the first access point comprising:
   an IAN transceiver configured to provide communication services at the public-safety incident scene, the IAN transceiver also configured to message other access points at the public-safety incident scene to determine a version of an application stored on the other access points, wherein the other access points are part of other self-forming, temporary network infrastructures brought to the public-safety incident scene to support personal and local communications among different public safety end-users, the IAN transceiver also configured to receive a request for the application from a device associated with the first access point;

a database storing the information on versions application stored on the other access points;

logic circuitry configured to access the database to determine that another source for the application is a second IAN, the determination based on the version of the application stored on the database, and wherein the IAN transceiver is also configured to direct the device to hand over to a second access point to retrieve the application; and wherein the first access point and the second access point have differing system identifications and an overlapping coverage area.

11. The first access point of claim 10 wherein the IAN transceiver directs the device to hand over to the second access point by notifying the device that a better version of the application resides on the second access point.

12. The first access point of claim 11 wherein the second access point upgrades or downgrades the application on the device.

13. The first access point of claim 10 wherein the IAN transceiver directs the device to hand over to the second access point by directing the device to autonomously hand over to the second access point.

14. The first access point of claim 13 wherein the second access point upgrades or downgrades the application on the device.

15. The first access point of claim 10 wherein the particular application comprises an application or data.

* * * * *